United States Patent [19]

Sydansk

[11] Patent Number: 5,346,008
[45] Date of Patent: Sep. 13, 1994

[54] POLYMER ENHANCED FOAM FOR TREATING GAS OVERRIDE OR GAS CHANNELING

[75] Inventor: Robert D. Sydansk, Littleton, Colo.

[73] Assignee: Marathon Oil Company, Findlay, Ohio

[21] Appl. No.: 22,703

[22] Filed: Mar. 1, 1993

Related U.S. Application Data

[63] Continuation-in-part of Ser. No. 1,484, Jan. 7, 1993.

[51] Int. Cl.$^5$ .................... E21B 43/22; E21B 43/32
[52] U.S. Cl. ............................ 166/274; 166/305.1; 166/309
[58] Field of Search ............. 166/274, 273, 309, 305.1, 166/279

[56] References Cited

U.S. PATENT DOCUMENTS

| | | | |
|---|---|---|---|
| 3,368,624 | 2/1968 | Heuer, Jr. et al. | 166/309 X |
| 3,379,260 | 4/1968 | O'Brien | 166/309 X |
| 3,393,738 | 7/1968 | Bernard et al. | 166/309 X |
| 4,676,316 | 6/1987 | Mitchell | 166/274 |
| 5,129,457 | 7/1992 | Sydansk | 166/274 |

OTHER PUBLICATIONS

Hanssen, J. E., et al., "Foams for Effective Gas Blockage in the Presence of Crude Oil", SPE Paper, Apr. 22, 1990.

Krause, R. E., et al., "Foam Treatment of Producing Wells to Increase Oil Production at Prudhoe Bay", SPE Paper, Apr. 22, 1992.

Persoff, P., et al., "Aqueous Foams for Control of Gas Migration and Water Coning in Aquifer Gas Storage", Energy Sources, 1990.

Primary Examiner—Stephen J. Novosad

[57] ABSTRACT

A process is provided for promoting oil production from a producing interval of a subterranean hydrocarbon-bearing formation by reducing undesirable gas production therefrom due to gas override or gas channeling in the upper portion of the interval. A polymer enhanced foam containing a polymer, an aqueous solvent, a surfactant, and a gas is placed in the upper portion of the producing interval, thereby substantially inhibiting or blocking the flow of gas therethrough to an oil production wellbore in fluid communication with the producing interval and enabling oil to more readily enter the wellbore for production to the surface.

17 Claims, 2 Drawing Sheets

1

POLYMER ENHANCED FOAM FOR TREATING GAS OVERRIDE OR GAS CHANNELING

This is a continuation-in-part patent application of my prior copending patent application, U.S. Ser. No. 08/001,484, filed on Jan. 7, 1993, and entitled "Polymer Enhanced Foams For Reducing Gas Coning."

BACKGROUND OF THE INVENTION

1. Technical Field

The present invention relates to a process for producing oil from a subterranean hydrocarbon-bearing formation, and more particularly to such a process wherein a polymer enhanced foam is placed in the formation to reduce gas production therefrom due to gas override or gas channeling, thus sustaining or increasing the oil production rate from the formation.

2. Description of Related Art

Oil production wellbores in formations undergoing gas flooding or other gas injection operations can become uneconomic due to excessive gas production from the wellbore. Such undesirable gas production can result from gas gravity override or gravity-driven gas channeling high in the producing interval.

Gas gravity override is the tendency of injected gas to gravity segregate and propagate excessively quickly in the upper portion of a producing interval, i.e., high up in the interval, due to the low density and high mobility (low viscosity) of the injected gas. Gravity-driven gas channeling is an excessively high propagation rate of injected gas in the upper portion of a producing interval due specifically to the presence of high-permeability heterogeneities therein, whereas gas gravity override often occurs in producing intervals made up solely of homogeneous matrix. Although it may be desirable at some point in an oil recovery process to recover gas injected into a producing interval for such purposes as pressure maintenance, oil mobilization or oil displacement, the above-recited mechanisms often cause the injected gas to prematurely break through to the production wellbore via the upper portion of the producing interval before fully serving its intended purpose.

Consequently, gas gravity override and gravity-driven gas channeling in the upper portion of the producing interval result in detrimental and costly production of gas at the expense of otherwise relatively high rates of more desirable oil production. Gas production due to gas gravity override or gravity-driven gas channeling competes with oil production so that an excessive gas production rate causes a corresponding diminished oil production rate. Thus, every barrel of increased oil production rate resulting from a reduction in gas production represents an incremental barrel of oil production rate and an accelerated cash flow to the producer.

Accordingly, it is an object of the present invention to reduce gas production from an oil production wellbore experiencing gas gravity override or gravity-driven gas channeling. It is another object of the present invention to reduce the gas/oil ratio from an oil production wellbore experiencing gas gravity override or gravity-driven gas channeling. It is also an object of the present invention to increase or sustain the oil production rate from an oil production wellbore experiencing gas gravity override or gravity-driven gas channeling. It is further an object of the present invention to reduce the decline rate of oil production from an oil production wellbore experiencing gas gravity override or gravity-driven gas channeling.

SUMMARY OF THE INVENTION

The present invention is a process utilizing a polymer enhanced foam to sustain or increase the production rate of oil, or alternatively to reduce the rate of oil production decline from a producing interval of a subterranean hydrocarbon-bearing formation via a production wellbore in fluid communication with the interval. The process is specific to a subterranean formation experiencing gas gravity override or gravity-driven gas channeling of an injected gas in the upper portion of the producing interval. The polymer enhanced foam is utilized as a gas blocking agent to mitigate the inhibiting effect of gas override or channeling on oil production into the production wellbore.

The polymer enhanced foam comprises a polymer, an aqueous solvent, a surfactant, and a gas. The foam is placed in the upper portion of the oil producing interval to effectively reduce the mobility of injected gas therein. Placement of the foam is preferably achieved via the production wellbore to effect a near wellbore treatment thereof. Accordingly, the polymer enhanced foam treatment reduces gas production and promotes the more desirable production of oil from the producing interval via the production wellbore to the surface.

DESCRIPTION OF PREFERRED EMBODIMENTS

Figure 1A:
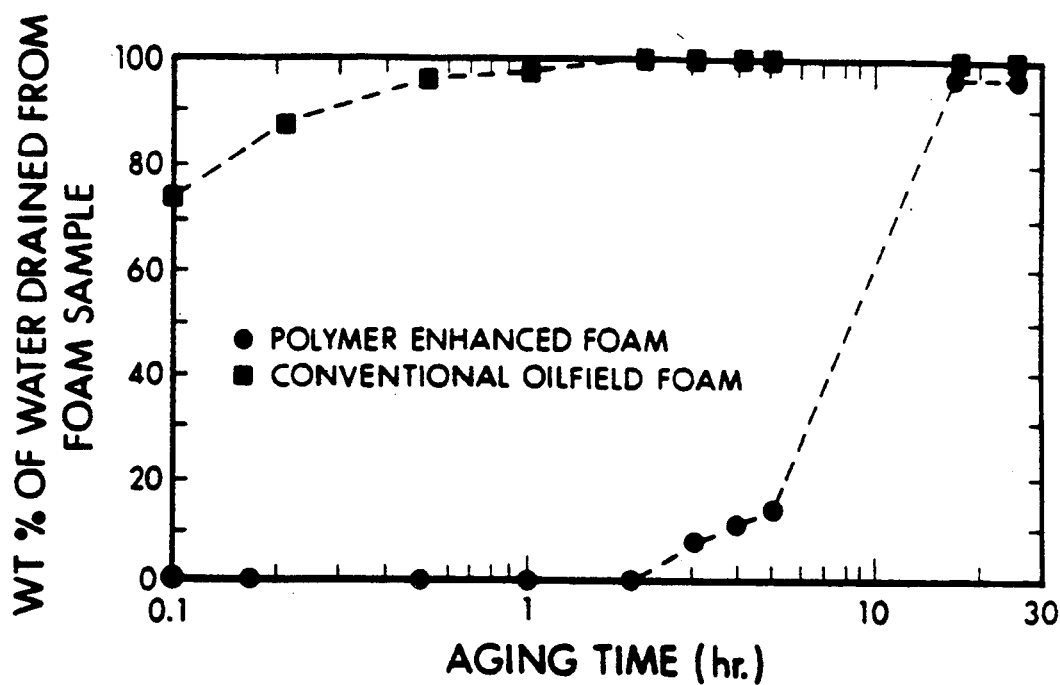
FIG. 1a is a graph comparing the rate of water drainage in a polymer enhanced foam of the present invention and a conventional oilfield foam as described in Example 1.

A number of specific terms are used throughout the specification to describe the process of the present invention and are defined as follows. A subterranean hydrocarbon-bearing formation is a geological structure which can comprise two general regions, "matrix" and "anomalies." An "anomaly" is a volume within the formation having a very high permeability relative to the remainder of the formation. The term "anomaly" is inclusive of such highly permeable volumes as fractures, fracture networks, joints, cracks, fissures, vugs, voids, solution channels, caverns, washouts, cavities, and the like. The matrix is essentially the remainder of the formation and is generally characterized as competent and substantially continuous, sedimentary geological material having a very low permeability relative to an anomaly. Nevertheless, the matrix of a heterogeneous formation can exhibit regions or strata of differing permeability, the highest permeability regions often being termed "high-permeability heterogeneities" or "high-permeability stringers."

The term "wellbore" is defined herein as a bore hole extending from the earth surface to a subterranean hydrocarbon-bearing formation. Thus, a wellbore is a conduit providing fluid communication between the surface and the formation penetrated thereby. A production wellbore enables the removal of fluids from the formation to the surface and an injection wellbore enables the placement of fluid into the formation from the surface. It is noted that a given wellbore can function interchangeably as a production wellbore or an injection wellbore depending on whether a fluid is being removed from or placed in the wellbore. The term "well" is synonymous with the term "wellbore."

A "foam" is a stabilized gas dispersion maintained within a liquid phase, wherein the dispersed gas phase constitutes at least half of the total volume of the foam. The foam appears as a plurality of gas bubbles separated from one another by stabilized films of liquid. In porous media, such as the formation matrix, the foam may exist as discrete gas bubbles within the pore bodies of the porous medium. The bubbles are separated from one another by lamellae of interfacially stabilized liquid films.

Conventional oilfield foams consist of a foaming gas dispersed in a surfactant solution made up of a surfactant and a solvent. The surfactant acts as a foaming agent to facilitate and stabilize the gas dispersion within the liquid phase. A "polymer enhanced foam" is a specific type of oilfield foam comprising a foaming gas dispersed in an aqueous surfactant solution, wherein the aqueous surfactant solution further includes a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter.

The process of the present invention is performed by generating and placing a polymer enhanced foam within a subterranean hydrocarbon-bearing formation penetrated by a liquid hydrocarbon production wellbore in the specific manner described hereafter. The polymer enhanced foam is generated from a substantially uncrosslinked polymer, an aqueous solvent, a surfactant and a gas. It is important to note that the foam composition is substantially free of any polymer crosslinking agent which could otherwise crosslink the polymer and convert the liquid phase of the foam to a crosslinked polymer gel at some point in the process.

The polymer component of the foam is substantially any water-soluble, viscosity-enhancing polymer that is substantially uncrosslinked. Either a biopolymer or a synthetic polymer has utility herein. Biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches.

Synthetic polymers having utility herein include polyvinyl alcohol, polyethylene oxide, polyvinyl pyrrilidone, and acrylamide polymers. Exemplary acrylamide polymers are polyacrylamide, partially hydrolyzed polyacrylamide, acrylamide copolymers containing acrylamide and one other monomeric species, and acrylamide terpolymers containing acrylamide and two other monomeric species, or acrylamide, acrylate, and one other monomeric species. Polyacrylamide (PA) is defined as an acrylamide homopolymer having substantially less than about 1% of its acrylamide groups converted to carboxylate groups. Partially hydrolyzed polyacrylamide (PHPA) is an acrylamide homopolymer having more than about 1%, but not 100%, of its acrylamide groups converted to carboxylate groups. Useful acrylamide polymers are prepared according to any conventional method, but preferably have the specific properties of an acrylamide polymer prepared according to the method disclosed in U.S. Pat. No. Re.32,114, incorporated herein by reference.

The average molecular weight of an acrylamide polymer having utility herein is generally in a range between about 10,000 and about 50,000,000, preferably between about 250,000 and about 20,000,000, and most preferably between about 1,000,000 and about 15,000,000. The polymer concentration in the liquid phase of the foam is generally at least about 500 ppm, preferably at least about 2,000 ppm, and most preferably within a range between about 5,000 ppm and about 10,000 ppm.

Polymers satisfying the criteria set forth above impart a high degree of stability to a polymer enhanced foam relative to conventional oilfield foams formulated from a foaming gas and a liquid phase containing a surfactant, but lacking polymer enhancement. The polymer enhanced foam better retains its stability when contacted by liquid hydrocarbons within the formation, relative to conventional polymer-free foams that are readily destabilized by hydrocarbon contact. Polymer enhancement of the foam also advantageously increases the structural strength and critical pressure gradient for flow of the foam relative to conventional polymer-free foams. The "critical pressure gradient for flow" is defined herein as the maximum pressure that can be applied to the foam without foam flow.

The aqueous solvent of the present polymer enhanced foam is substantially any aqueous liquid capable of forming a solution with the selected polymer. The term "solution" as used herein, in addition to true solutions, is intended to broadly encompass dispersions, emulsions, or any other homogenous mixture of the polymer in the aqueous solvent. The solvent is preferably either a fresh water or a brine, such as a produced water from the subterranean formation. Produced water can be advantageous because of its low-cost availability and because it enables the practitioner to return the produced water to the formation, thereby eliminating disposal thereof.

The surfactant of the polymer enhanced foam is substantially any water-soluble foaming agent suitable for oilfield use that is compatible with the specific polymer selected as will be evident to the skilled artisan. As such, the surfactant can be anionic, cationic or nonionic. A preferred surfactant is selected from the group consisting of ethoxylated alcohols, ethoxylated sulfates, refined sulfonates, petroleum sulfonates, and alpha olefin sulfonates. The concentration of surfactant in the liquid phase of the foam is in a range between about 20 ppm and about 50,000 ppm, preferably between about 50 ppm and about 20,000 ppm, and most preferably at least about 1000 ppm. In general, the performance of the polymer enhanced foam in the method of the present invention is relatively insensitive to the particular species and concentration of the surfactant selected, subject to the above-recited criteria, particularly when the selected polymer is an acrylamide polymer.

Virtually any foaming gas can be employed in the present polymer enhanced foam to the extent the gas is substantially chemically inert with respect to the other foam components and with respect to wellbore production or injection equipment. A preferred foaming gas is one which is readily available in the field. Such gases include nitrogen, air, carbon dioxide, flue gas, produced gas, and natural gas. The quality of the polymer enhanced foam product, i.e., the volume percentage of gas in the foam, is typically within a range from about 50% to about 99%, more preferably within a range from about 60% about 98%, and most preferably within a range from about 70% to about 97%.

Foam generation requires mixing the liquid phase and the foaming gas either at a high velocity or through a small orifice as can be provided by any conventional artificial foam generator. The liquid phase is preferably preformulated by dissolving the surfactant and polymer in the aqueous solvent prior to foam generation. The foam is then generated, for example, at the surface by passing the liquid phase and foaming gas through a surface foam generator and delivering the resulting foam to a production or injection wellbore for injection therein. Alternatively, the foam is generated at the surface by coinjecting the foaming gas and liquid phase into the wellbore across a surface injection tee acting as a foam generator. In another alternative, the foam is generated downhole by coinjecting the gas and liquid phases via separate tubing strings into the production wellbore and passing the two streams through a downhole foam generator.

The pH of the liquid phase in the polymer enhanced foam is generally within a range of about 4 to about 10, and preferably within a nearly neutral range of about 6 to about 8. In most cases, the pH of the liquid phase inherently falls within the above-recited range without any pH adjustment thereof. However, should the pH of the liquid phase be outside the desired range, the pH can be adjusted during foam generation in accordance with conventional oilfield procedures to achieve a desired pH range. The pH adjustment can be made in any manner known to the skilled artisan. Nevertheless, it has been found that the present process is relatively insensitive to the pH of the liquid phase.

Placement of the polymer enhanced foam in the subterranean hydrocarbon-bearing formation encompasses injection of the foam components into the formation via a liquid hydrocarbon production wellbore penetrating the formation, or alternatively via an injection wellbore penetrating the formation and in fluid communication with the liquid hydrocarbon production wellbore.

Although termed a "liquid hydrocarbon production wellbore" throughout the description, it is understood that pursuant to the present process the production wellbore may temporarily have an injection function for placement of the foam in the formation. The production wellbore is, however, restored to its hydrocarbon production function upon the completion of foam placement. In contrast, an "injection wellbore" as termed herein, is substantially limited to an injection function.

The formation penetrated by the wellbore is characterized as having a liquid hydrocarbon producing interval in direct fluid communication with a liquid hydrocarbon production wellbore, and in many cases with an injection wellbore, by conventional means such as perforations placed in the wellbore casing at the vertical position of the producing interval. The formation additionally has gas flowpaths in the upper portion of the producing interval that undesireably permit a flowing gas to flow from the producing interval into the production wellbore according to a gas gravity override or a gravity-driven gas channeling mechanism.

A flowing gas is defined herein as a gas injected into the producing interval and flowing across the upper portion thereof under a gas override or gas channeling mechanism toward the liquid hydrocarbon production wellbore, usually in a substantially horizontal radial direction. The flowing gas is generally a gas injected into the producing interval via an injection wellbore in fluid communication therewith for oil recovery or pressure maintenance. Flowing gas having utility herein is characterized in most cases as either a pressure maintenance gas or an oil recovery gas, wherein uses for oil recovery gases include oil mobilization or oil displacement. Such gasses are hydrocarbon miscible or immiscible and include carbon dioxide, steam, air, natural gas and flue gas.

The flowpaths comprise either gas-permeable matrix or anomalies and typically extend in a substantially horizontal or radial direction within the producing interval into the production wellbore. However, in some cases the flowpaths can be fractures or fracture networks extending in a substantially vertical direction within the producing interval into the production wellbore.

For purposes of the present invention, when the gas flowpaths in the upper portion of the producing interval are primarily made up of homogeneous formation matrix having a substantially uniform permeability, the gas flow mechanism therethrough is deemed to be gas gravity override. When the upper portion of the producing interval is made up of matrix having differing permeability regions or made up of both matrix and anomalies, such that the flowpaths are either anomalies or high-permeability matrix heterogeneities, the gas flow mechanism therethrough is deemed to be gravity-driven gas channeling.

A degree of selective placement of the foam in the upper portion of the producing interval is provided by the specific density characteristics of the polymer enhanced foam employed herein. In general, the foam is formulated to have a relatively lower density than the liquids residing in the producing interval. As such, when the polymer enhanced foam enters the producing interval across the casing perforations of the wellbore, the foam tends to preferentially flow upward through the formation into the flowpaths in the upper portion of the producing interval, driven by the density differential between the foam and resident liquids.

Placement of the foam is further facilitated by the relatively high shear thinning properties of the polymer enhanced foam. The polymer enhanced foam exhibits relatively high viscosities beyond the wellbore face, but exhibits relatively low effective viscosities under the high flow rate, high pressure gradient for flow and high shear rate conditions encountered at the wellbore face during the injection step due to the ability of the foam to highly shear thin.

Thus, the high shear thinning ability of the foam results in relatively good injectivity of the foam into the formation with a minimum of injectivity reduction. Nevertheless, once the polymer enhanced foam is successfully placed in the gas flowpaths, it beneficially shear thickens, thereby achieving a sufficient degree of structure and a sufficient critical pressure gradient for flow to render the polymer enhanced foam an effective gas blocking agent.

It is preferred, in accordance with the present invention, to place the polymer enhanced foam in gas flowpaths within the near wellbore region of the liquid hydrocarbon production wellbore which undesireably facilitate gas override or gas channeling. The near wellbore region is defined herein as the region of the formation which extends radially outward to at least about 3 meters from the wellbore in the producing interval, and in many cases to at least about 10 meters from the wellbore in the producing interval.

Placement of the foam is preferably achieved by injection of the foam or the foam components into the producing interval via the liquid hydrocarbon production wellbore, as described hereafter. It is, however, within the scope of the present invention to inject the foam or certain or all of the foam components individually into the producing interval via an injection wellbore horizontally spaced from the production wellbore and in fluid communication therewith. In this case, the foam is preferably subsequently displaced into the gas flowpaths within the near wellbore region of the liquid hydrocarbon production wellbore or within outlying regions of the producing interval beyond the near wellbore region. It is noted that if the foaming gas is injected into an injection wellbore for in situ foam generation, as described hereafter, the foaming gas can simultaneously act as a flowing gas.

The character of the region of the formation in which it is desired to place the foam can influence the selection of a specific foam composition. In general, placement of a foam in less permeable matrix preferentially dictates selection of a foam having relatively limited structure, whereas a foam having a greater degree of structure can be selected for placement in more permeable stringers or anomalies. The degree of structure of the polymer enhanced foam formulated in the manner of the present invention is primarily a function of the polymer properties and polymer concentration.

In general, the degree of structure of a polymer enhanced foam containing an acrylamide polymer is increased by increasing the polymer concentration of the liquid phase. However, a more cost-effective and preferred means for achieving the same effect is to employ a higher molecular weight polymer or, alternatively, a polymer having a higher degree of hydrolysis at a relatively fixed concentration. Conversely, a reduction in the degree of structure is achieved by using a lower molecular weight polymer or, alternatively, one having a lower degree of hydrolysis. Thus, the skilled practitioner can modify the degree of structure of the present polymer enhanced foam in the above-described manner to correspond with the permeability of the region of the formation in which the foam is to be placed.

As is apparent from above, the performance of the polymer enhanced foam as a gas blocking agent is a function of its critical pressure gradient for flow, which can alternatively be termed yield pressure. When flowing gas flows by means of a gas override or gas channeling mechanism to the production wellbore via gas flowpaths in the producing interval, the flowing gas usually encounters a gas flow pressure gradient. It is necessary that the foam occupying the gas flowpaths, across which the flowing gas must flow to reach the production wellbore, exhibits a critical pressure gradient for foam flow higher than the gas flow pressure gradient. By satisfying this criteria, the gas is unable to mobilize the foam and displace it from the flowpaths. Consequently, the foam performs as an effective gas blocking agent in accordance with the present invention.

Relative to conventional polymer-free oilfield foams, the polymer enhanced foam is highly stable and resistant to flow. The polymer enhanced foam is stable over a wide range of temperatures, pressures, and formation water salinities and hardness. The polymer enhanced foam is also relatively stable in the presence of liquid hydrocarbons, resisting collapse and fluid drainage. The foam can be self healing so that if foam degradation occurs, the foam is capable of reforming itself as it begins to flow through the formation. Thus, placement of the foam in desired regions of the formation provides long-term gas blockage of flowpaths to the production wellbore, thereby substantially reducing gas production when liquid hydrocarbon production is resumed after foam injection is terminated and the foam is fully in place within the formation. Nevertheless, the formation can be restored to its original condition, if desired, by injection of a conventional breaker into the formation to degrade the foam or polymer in situ.

Embodiments of the present process have been described above wherein, the polymer enhanced foam is generated prior to placement of the foam in the formation. However, other embodiments exist within the scope of the present invention, wherein the polymer enhanced foam is generated in situ simultaneous with placement of the foam in the formation. The restricted flowpaths of the formation matrix act as a natural foam generator. In one such embodiment, the liquid phase and foaming gas are sequentially injected into the liquid hydrocarbon production wellbore or an injection wellbore with the liquid phase preferably preceding the foaming gas. This sequence enables the higher-mobility trailing gas slug to overtake and finger through the leading liquid slug as the injected fluids are displaced into the formation. Passage of the gas and liquid phases through the pore throats of the matrix desirably results in foam formation. The volume of the liquid and gas slugs injected into the wellbore can be relatively small, but repetitive, to optimize utilization of the surfactant.

In another embodiment, the liquid phase is the only fluid placed in the formation via the production wellbore or an injection wellbore. When liquid hydrocarbon production is resumed in the production wellbore, flowing gas passing through the upper portion of the producing interval toward the liquid hydrocarbon production wellbore as the result of gas override or gas channeling tends to finger through the liquid phase. Passage of the gas and liquid phases through the pore throats of the matrix results in foam formation in the same manner as described above.

It is apparent that the treatment process of the present invention is frequently applied to precede a gas injection process for enhancing oil recovery from the producing interval of a formation via a liquid hydrocarbon production wellbore. As such, once the polymer enhanced foam is placed in the formation in any manner as set forth above, injection of a flowing gas into the producing interval via an injection wellbore is generally resumed. The flowing gas is typically a pressure maintenance gas or an oil recovery gas.

At the conclusion of the treatment process, the production wellbore is restored to normal operation, producing oil therefrom, preferably at a sustained or increased rate of oil production, or alternatively at a reduced rate of oil production decline. Correspondingly, the gas production rate or gas/oil ratio from the liquid hydrocarbon production wellbore is preferably reduced.

The following examples demonstrate the practice and utility of the present invention, but are not to be construed as limiting the scope thereof.

EXAMPLE 1

A sample of a polymer enhanced foam and a sample of a conventional oilfield foam that is substantially identical in composition to the polymer enhanced foam except for the absence of a polymer component are prepared to compare the stability, and in particular the resistance to physical collapse and water drainage, of the two foams. The liquid phase of both foams is made up of a fresh water solvent containing 1000 ppm of a $C_{12-15}$ ethoxylated sulfate surfactant. The liquid phase of the polymer enhanced foam, however, is further enhanced with an unhydrolyzed polyacrylamide at a concentration of 7000 ppm. The molecular weight of the polymer is 11,000,000.

Foam samples are generated by sequentially flooding a sandpack under identical conditions with one of the above-recited liquid phases and a gas phase consisting of $N_2$. The sandpack has a permeability of 67 darcies, a length of 30 cm and a diameter of 1.1 cm. All flooding is conducted at 170 kPa constant differential pressure across the sandpack. The polymer enhanced foam propagates at a frontal advance rate of 207 m/day and exhibits an average apparent effective viscosity within the sandpack of 89 cp, while the conventional foam propagates at a frontal advance rate of 8230 m/day and exhibits an average apparent effective viscosity of only 2 cp at the same differential pressure.

Figure 1B:
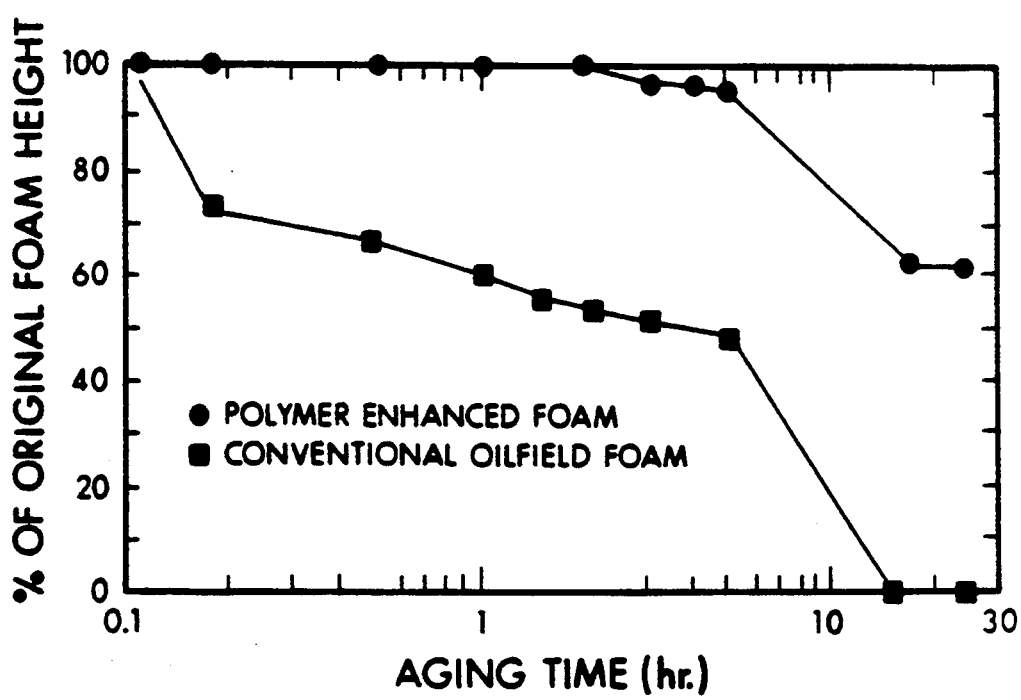
FIG. 1b is a graph comparing the rate of foam collapse in a polymer enhanced foam of the present invention and a conventional oilfield foam as described in Example 1.

A 100 cc sample of each foam is collected as an effluent from the sandpack and placed in a stoppered graduated cylinder for aging at ambient temperature. The position of the foam/water and foam/air interfaces in the graduated cylinders are measured as a function of time to determine the rates of water drainage and foam collapse, respectively for each of the samples. The results are shown in FIGS. 1a and 1b, respectively. It is apparent therein that the rates of water drainage and foam collapse are much greater for a conventional foam than a polymer enhanced foam. Thus, this example shows that the polymer enhanced foam is more stable and more viscous than the conventional oilfield foam.

EXAMPLE 2

A sandpack is flooded with a series of polymer enhanced foam samples, differing only in the foam quality of each sample, to determine the relation between foam quality and apparent viscosity for the polymer enhanced foam of the present invention. The sandpack has a length of 30 cm and a permeability of 150 darcies. All flooding is conducted at 340 kPa constant differential pressure across the sandpack. The polymer enhanced foam propagates at a frontal advance rate of 145 m/day.

The foam is formulated from $N_2$ and a synthetic injection water brine solvent containing a $C_{14-16}$ alpha olefin sulfonate surfactant at a concentration of 2,000 ppm and a partially hydrolyzed polyacrylamide at a concentration of 7,000 ppm. The partially hydrolyzed polyacrylamide has a molecular weight of 11,000,000 and is 30% hydrolyzed. The results are set forth below in Table 1.

TABLE 1

| FOAM QUALITY (%) | AVERAGE APPARENT VISCOSITY (cp) |
| --- | --- |
| 0 | 150 |
| 57 | 190 |
| 63 | 200 |
| 74 | 210 |
| 80 | 230 |
| 85 | 230 |
| 89 | 240 |
| 93 | 240 |

The results indicate that the performance of the polymer enhanced foam is relatively insensitive to foam quality.

EXAMPLE 3

A sample of a polymer enhanced foam and a sample of a conventional oilfield foam that is substantially identical in composition to the polymer enhanced foam except for the absence of a polymer component are prepared to compare the effective viscosities of the two foams as a function of foam quality. Both foams are formulated from $N_2$ and a synthetic injection water brine solvent having a $C_{14-16}$ alpha olefin sulfonate surfactant dissolved therein at a concentration of 2,000 ppm. The synthetic brine contains 5,800 ppm TDS and has principle constituents in the following concentrations: 560 ppm $Ca^{++}$, 160 ppm $Mg^{++}$, 1,500 ppm $Na^+$, 200 ppm $K^+$, 2,200 ppm $SO_4^-$, and 1400 $Ce^z$.

The polymer enhanced foam additionally contains a partially hydrolyzed polyacrylamide at a concentration of 7,000 ppm. The partially hydrolyzed polyacrylamide has a molecular weight of 7,000,000 and is 30% hydrolyzed.

A sandpack substantially the same as that of Example 2 is flooded with each foam. The polymer enhanced foam sample is flooded at a backpressure of 3060 kPa and a differential pressure of 340 kPa. The polymer enhanced foam propagates at a frontal advance rate of between about 146 and 213 m/day. The conventional foam sample is flooded at atmospheric pressure and a differential pressure of 136 kPa and propagates at a frontal advance rate of between about 335 and 1460 m/day.

Figure 2:
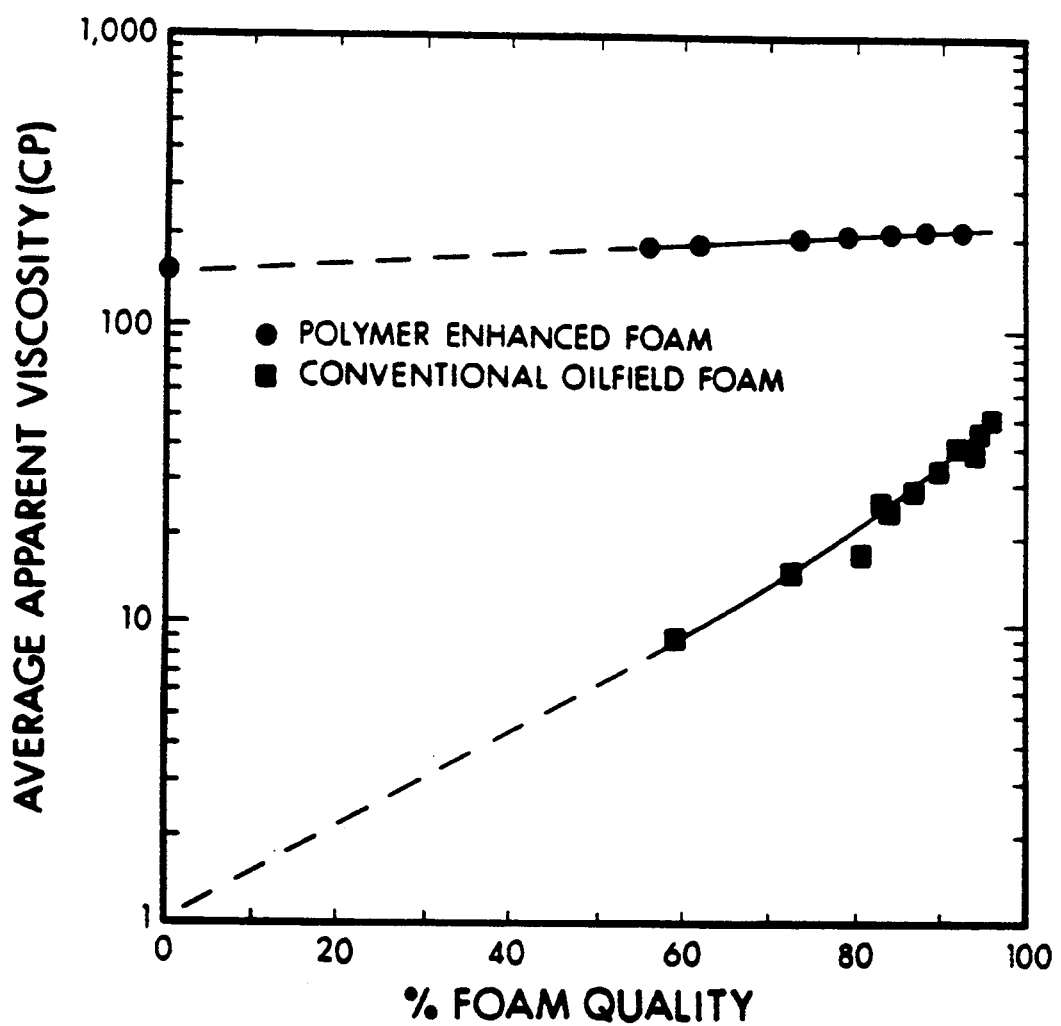
FIG. 2 is a graph comparing foam viscosity as a function of foam quality in a polymer enhanced foam of the present invention and a conventional oilfield foam as described in Example 3.

The results are set forth in FIG. 2 and indicate that the sensitivity of the polymer enhanced foam viscosity to foam quality is much less than that for the conventional foam. Furthermore, the effective viscosity of the polymer enhanced foam at any given foam quality is much greater than that of the conventional foam.

EXAMPLE 4

A sandpack is flooded with a fully formed polymer enhanced foam sample to determine the critical pressure gradient for foam flow. The sandpack has a length of 30 cm and a permeability of 140 darcies. The critical pressure gradient for foam flow is determined to be in the range of 1.34 to 1.56 kPa/cm. The expected gas flow pressure gradient is often less than 1.34 kPa/cm suggesting that the polymer enhanced foam is well suited for effective blocking of flowing gas driven by a gas override or channeling mechanism.

EXAMPLE 5

Two separate floods of a sandpack are conducted at room temperature with 0.2 pore volumes of a fully formed polymer enhanced foam sample followed by 0.8 pore volumes of a brine. In the first flood the sandpack is flushed with a brine immediately prior to foam injection and the sandpack is initially at 100% brine saturation. In the second flood the sandpack is flushed with a brine, saturated with a crude oil, and then flooded with the brine to $S_{or}$ immediately prior to foam injection to demonstrate the stability of the polymer enhanced foam in the presence of crude oil.

The sandpack has a permeability of 150 darcies, a length of 6.1 m and a diameter of 0.46 cm. A constant differential pressure of 680 kPa is applied to the sandpack. The foam is formulated from $N_2$ and the synthetic injection water brine of Example 4, having a $C_{14-16}$ alpha olefin sulfonate surfactant and a partially hydrolyzed polyacrylamide dissolved therein at concentrations of 2,000 ppm and 7,000 ppm respectively. The partially hydrolyzed polyacrylamide has a molecular weight of 11,000,000 and is 30% hydrolyzed. The foam in the first flood has an apparent viscosity of 43 cp after it has propagated almost entirely through the sandpack, while the foam in the second flood has an apparent viscosity of 50 cp after it has propagated almost entirely through the sandpack. These results suggest that polymer enhanced foam performance is relatively insensitive to hydrocarbons and, thus, the polymer enhanced foam functions well in the presence of crude oil.

While the foregoing preferred embodiments of the invention have been described and shown, it is understood that alternatives and modifications, such as those suggested and others, may be made thereto and fall within the scope of the present invention.

I claim:

1. A process for reducing gas production into a liquid hydrocarbon production wellbore in fluid communication with a hydrocarbon producing interval of a subterranean formation, the process comprising:
   injecting foam components into said liquid hydrocarbon production wellbore, said foam components comprising a substantially uncrosslinked polymer, a surfactant, an aqueous solvent, and a foaming gas, thereby placing a polymer enhanced foam in a gas flowpath in said hydrocarbon producing interval, wherein said foam comprises said substantially uncrosslinked polymer, said surfactant, said aqueous solvent, and said foaming gas, and wherein said foam substantially reduces the flow of a flowing gas through said flowpath into said liquid hydrocarbon production wellbore.

2. The process for reducing gas production into a liquid hydrocarbon production wellbore of claim 1 wherein said foam has a critical pressure gradient for foam flow greater than a gas flow pressure gradient exhibited by said flowing gas.

3. The process for reducing gas production into a liquid hydrocarbon production wellbore of claim 1 wherein said flowpath is in an upper portion of said hydrocarbon producing interval.

4. The process for reducing gas production into a liquid hydrocarbon production wellbore of claim 3 wherein said flowpath comprises substantially homogeneous formation matrix.

5. The process for reducing gas production into a liquid hydrocarbon production wellbore of claim 3 wherein said upper portion of said hydrocarbon producing interval comprises a region of relatively lower permeability and a region of relatively higher permeability and said flowpath is said region of relatively higher permeability.

6. The process for reducing gas production into a liquid hydrocarbon production wellbore of claim 5 wherein said flowpath is an anomaly.

7. The process for reducing gas production into a liquid hydrocarbon production wellbore of claim 5 wherein said region of relatively higher permeability comprises formation matrix.

8. The process for reducing gas production into a liquid hydrocarbon production wellbore of claim 1 wherein said flowing gas is an oil recovery gas.

9. The process for reducing gas production into a liquid hydrocarbon production wellbore of claim 1 wherein said flowing gas is a pressure maintenance gas.

10. The process for reducing gas production into a liquid hydrocarbon production wellbore of claim 1 further comprising injecting said flowing gas into said hydrocarbon producing interval via an injection wellbore in fluid communication with said liquid hydrocarbon production wellbore after placement of said foam in said gas flowpath.

11. The process for reducing gas production into a liquid hydrocarbon production wellbore of claim 1 wherein said foaming gas is said flowing gas.

12. The process for reducing gas production into a liquid hydrocarbon production wellbore of claim 1 wherein said foam is placed in said flowpath by injection of said polymer, surfactant, and solvent into said liquid hydrocarbon production wellbore.

13. A process for reducing gas production into a liquid hydrocarbon production wellbore in fluid communication with a hydrocarbon producing interval of a subterranean formation, the process comprising:
   premixing a substantially uncrosslinked polymer, a surfactant and an aqueous solvent to form a liquid phase and combining said liquid phase with a foaming gas at the surface to formulate a polymer enhanced foam;
   injecting said foam into said formation via said liquid hydrocarbon production wellbore; and
   placing said foam in a gas flowpath in said hydrocarbon producing interval, wherein said foam comprises said polymer, surfactant, solvent, and foaming gas, and wherein said foam substantially reduces the flow of a flowing gas through said flowpath into said liquid hydrocarbon production wellbore.

14. A process for reducing gas production into a liquid hydrocarbon production wellbore in fluid communication with a hydrocarbon producing interval of a subterranean formation, the process comprising:
   premixing a substantially uncrosslinked polymer, a surfactant and an aqueous solvent to form a liquid phase;
   coinjecting said liquid phase and a foaming gas into said liquid hydrocarbon production wellbore; and
   placing a polymer enhanced foam in a gas flowpath in said hydrocarbon producing interval, wherein said foam comprises said liquid phase and said foaming gas, and wherein said foam substantially reduces the flow of a flowing gas through said flowpath into said liquid hydrocarbon production wellbore.

15. A process for reducing gas production into a liquid hydrocarbon production wellbore in fluid communication with a hydrocarbon producing interval of a subterranean formation, the process comprising:
   premixing a substantially uncrosslinked polymer, a surfactant and an aqueous solvent to form a liquid phase and combining said liquid phase with a foaming gas at the surface to formulate a polymer enhanced foam;

injecting said foam into said formation via an injection wellbore in fluid communication with said liquid hydrocarbon production wellbore; and placing said foam in a gas flowpath in said hydrocarbon producing interval, wherein said foam comprises said polymer, surfactant, solvent, and foaming gas, and wherein said foam substantially reduces the flow of a flowing gas through said flowpath into said liquid hydrocarbon production wellbore.

16. A process for reducing gas production into a liquid hydrocarbon production wellbore in fluid communication with a hydrocarbon producing interval of a subterranean formation, the process comprising:

premixing a substantially uncrosslinked polymer, a surfactant and an aqueous solvent to form a liquid phase;

coinjecting said liquid phase and a foaming gas into an injection wellbore in fluid communication with said liquid hydrocarbon production wellbore; and placing a polymer enhanced foam in a gas flowpath in said hydrocarbon producing interval, wherein said foam comprises said liquid phase and said foaming gas, and wherein said foam substantially reduces the flow of a flowing gas through said flowpath into said liquid hydrocarbon production wellbore.

17. A process for reducing gas production into a liquid hydrocarbon production wellbore in fluid communication with a hydrocarbon producing interval of a subterranean formation, the process comprising:

placing a polymer enhanced foam in a gas flowpath in an upper portion of said hydrocarbon producing interval via said liquid hydrocarbon production wellbore, wherein said foam comprises a substantially uncrosslinked polymer, a surfactant, an aqueous solvent, and a foaming gas, and further wherein said foam has a critical pressure gradient for foam flow greater than a gas flow pressure gradient exhibited by an injected flowing gas to substantially reduce the flow of said flowing gas through said flowpath into said liquid hydrocarbon production wellbore.

* * * * *